United States Patent [19]

Friese et al.

[11] Patent Number: 4,629,610
[45] Date of Patent: Dec. 16, 1986

[54] HYDROGEN FLUORIDE RECOVERY PROCESS

[75] Inventors: David D. Friese, Concord; Mark A. Van Dort, Pleasant Hill, both of Calif.

[73] Assignee: Dow Chemical Co., Midland, Mich.

[21] Appl. No.: 732,532

[22] Filed: May 10, 1985

[51] Int. Cl.$^4$ .............................................. C01B 7/19
[52] U.S. Cl. ..................................... 423/240; 423/488
[58] Field of Search .................... 423/240 R, 483, 488

[56] References Cited

U.S. PATENT DOCUMENTS

| | | | |
|---|---|---|---|
| 3,356,749 | 12/1967 | Van Dijk | 423/488 |
| 3,699,209 | 10/1972 | Ward | 423/483 |
| 4,083,941 | 4/1978 | Jayawant et al. | 423/488 |
| 4,128,626 | 12/1978 | Merchant | 423/240 |
| 4,157,376 | 6/1979 | Vulikh et al. | 423/488 |
| 4,233,281 | 11/1980 | Hirko et al. | 423/488 |
| 4,317,805 | 3/1982 | Robota et al. | 423/488 |

*Primary Examiner*—John Doll
*Assistant Examiner*—Anthony McFarlane

[57] ABSTRACT

A process for recovering hydrogen fluoride from waste stream gases containing hydrogen fluoride by contacting the waste stream with a scrubbing agent comprising a chlorinated pyridine.

10 Claims, No Drawings

HYDROGEN FLUORIDE RECOVERY PROCESS

BACKGROUND OF THE INVENTION (Trifluoromethyl)pyridine compounds for use in making herbicides are customarily prepared by the fluorination of (trichloromethyl)pyridine compounds as described, for example, in copending application Ser. No. 520,399 filed Aug. 4, 1983. Such processes generally require the use of an excess of fluorinating agent, e.g. hydrogen fluoride, and even when employing a reflux condenser, the vent gases from the fluorination reactor, usually a mixture of hydrogen fluoride and hydrogen chloride, must be collected and disposed of in an environmentally acceptable way, such as, for example, by contacting with aqueous NaOH. That method produces an aqueous waste product containing substantial quantities of fluoride.

SUMMARY OF THE INVENTION

This invention provides a process for the recovery of hydrogen fluoride from waste stream gases which comprises contacting said waste stream gases with a scrubbing agent comprising a chlorinated pyridine, thereby removing substantial quantities of hydrogen fluoride from said waste stream gases. The hydrogen fluoride (HF) is absorbed by the chlorinated pyridine and may be recycled directly to the fluorination reactor. The invention further provides a process for recovering hydrogen chloride, which is generated during the fluorination process, in a form suitable for commercial applications.

DETAILED DESCRIPTION OF THE INVENTION

The chlorinated pyridines that are advantageously employed in the practice of this invention include, for example, 2-chloro-5-trichloromethyl)pyridine and 2,3-dichloro-5-(trichloromethyl)pyridine.

When using 2,3-dichloro-5-(trichloromethyl)pyridine, the chlorinated pyridine scrubber is advantageously employed at a temperature of 20°–50° C. and a pressure of 0–50 psig. Preferred operating ranges are 25°–35° C. and 0–10 psig.

The vapor feed composition will generally contain less than 50 mol percent hydrogen fluoride and usually will contain from about 1 to about 30 mol percent hydrogen fluoride.

The use of chloropyridines as scrubbing agents to remove hydrogen fluoride from a gas stream containing the same provides a ready method for recycling HF to the reactor, thereby increasing the efficiency of the process while at the same time reducing the fluoride containing waste streams and upgrading the vent gases to a product grade HCl, which can be sold instead of scrubbed.

Chloropyridines that can be used in the process of this invention include, for example, 2,3,-dichloro-5-(trichloromethyl)pyridine; 2-chloro-5-(trichloromethyl)pyridine; and the corresponding 2-chloro- and 2,3-dichloro-5-(chlorodifluoro and dichlorofluoro).

The process of this invention is advantageously employed in the preparation of 2,3-dichloro-5-(trifluoromethyl)pyridine from 2,3-dichloro-5-(trichloromethyl)pyridine as described in the following examples.

EXAMPLE 1

A vapor stream at 21° C. and containing 20 grams/hr of HF and 390 grams/hr of HCl was fed continuously to the bottom of a countercurrent packed column. Pure 2,3-dichloro-5-(trichloromethyl)pyridine was fed at 31° C. and 3650 grams/hr to the top of the column. The column was operated at atmospheric pressure. The one-inch diameter packed column consisted of a 36-inch packed height of 3 mm diameter Teflon ®TFE Raschig rings. The outlet vapor stream from the top of the column consisted of 1.0 mol percent HF compared to the inlet vapor stream composition of 8.6 mol percent HF. Analysis of the liquid stream exiting the column showed the liquid preferentially absorbed HF out of the vapor stream. The exiting liquid stream contained 85.8 mol percent 2,3-dichloro-5-(trichloromethyl)pyridine, 5.8 mol percent HF and 8.4 mol percent HCl. The percent HF feed that was recovered was 91 percent.

EXAMPLE 2

A vapor stream at 21° C. and containing 15 grams/hr HF and 480 grams/hr HCl was fed continuously to the bottom of a countercurrent packed column. Pure 2,3-dichloro-5-(trichloromethyl)pyridine was fed at 30° C. and 3650 grams/hr to the top of the column. The column pressure was 10–12 psig. The 1-inch diameter packed column consisted of a 36-inch packed height of 3 mm diameter Teflon ®TFE Raschig rings. The output vapor stream consisted of 0.3 mol percent HF, compared to the vapor feed stream composition of 5.4 mol percent HF. Analysis of the exiting liquid stream was 83.3 mol percent 2,3-dichloro-5-(trichloromethyl)pyridine, 4.1 mol percent HF and 12.6 mol percent HCl. This represented a recovery of 95 percent of the HF in the reactor vent gas.

We claim:

1. A process for recovering hydrogen fluoride from waste stream gases containing hydrogen fluoride which comprises contacting said waste stream with a scrubbing agent comprising a chlorinated pyridine.

2. Process of claim 1 wherein the waste stream comprises hydrogen fluoride and hydrogen chloride.

3. Process of claim 2 wherein the scrubbing agent is 2,3-dichloro-5-(trichloromethyl)pyridine.

4. Process of claim 2 wherein the scrubbing agent comprises 2,3-dichloro-5-(chlorodifluoromethyl)pyridine, 2,3-dichloro-5-(dichlorofluoromethyl)pyridine or a mixture of said pyridines with 2,3-dichloro-5-(trichloromethyl)pyridine.

5. Process of claim 3 wherein the temperature is from 20° to 50° C.

6. Process of claim 5 wherein the pressure is from atmospheric pressure to 50 psig.

7. Process of claim 5 wherein the temperature is from 25° to 35° C.

8. Process of claim 7 wherein the pressure is from atmospheric pressure to 10 psig.

9. Process of claim 3 wherein the hydrogen fluoride and 2,3-dichloro-5-(trichloromethyl)pyridine scrubbing agent is utilized in a fluorination reaction to prepare 2,3-dichloro-5-(trifluoromethyl)pyridine.

10. Process of claim 2 wherein the hydrogen chloride is recovered.

UNITED STATES PATENT AND TRADEMARK OFFICE
CERTIFICATE OF CORRECTION

PATENT NO. : 4,629,610

DATED : December 16, 1986

INVENTOR(S) : David D. Friese and Mark A. Van Dort

It is certified that error appears in the above-identified patent and that said Letters Patent is hereby corrected as shown below:

Column 1, line 61, "2,3,-dichloro-5-(tri-" should read -- 2,3-dichloro-5-(tri- --.

Column 1, line 64, "dichlorofluoro)." should read --dichlorofluoro)-methyl pyridine.--

Column 2, line 32, "put" should read --let--.

Signed and Sealed this

First Day of December, 1987

Attest:

DONALD J. QUIGG

Attesting Officer     Commissioner of Patents and Trademarks